(12) United States Patent
Munafo et al.

(10) Patent No.: US 12,490,756 B2
(45) Date of Patent: Dec. 9, 2025

(54) FLAVOR COMPOSITIONS CONTAINING POTASSIUM SALTS

(71) Applicant: Mars, Incorporated, McLean, VA (US)

(72) Inventors: John P. Munafo, Hackettstown, NJ (US); John Didzbalis, Hackettstown, NJ (US); Jadwiga Leonczak, Hackettstown, NJ (US); Monika Tomaszewski, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 463 days.

(21) Appl. No.: 17/501,485

(22) Filed: Oct. 14, 2021

(65) Prior Publication Data

US 2022/0061349 A1    Mar. 3, 2022

Related U.S. Application Data

(62) Division of application No. 15/322,132, filed as application No. PCT/US2015/038053 on Jun. 26, 2015, now Pat. No. 11,968,997.

(60) Provisional application No. 62/018,429, filed on Jun. 27, 2014.

(51) Int. Cl.
| A23G 1/32 | (2006.01) |
| A23C 9/156 | (2006.01) |
| A23G 1/00 | (2006.01) |
| A23G 1/02 | (2006.01) |
| A23G 1/04 | (2006.01) |
| A23G 1/56 | (2006.01) |

(52) U.S. Cl.
CPC ............. *A23G 1/32* (2013.01); *A23C 9/156* (2013.01); *A23G 1/00* (2013.01); *A23G 1/0046* (2013.01); *A23G 1/02* (2013.01); *A23G 1/047* (2013.01); *A23G 1/56* (2013.01); *A23V 2002/00* (2013.01)

(58) Field of Classification Search
CPC .......... A23G 1/32; A23G 1/00; A23G 1/0046; A23G 1/02; A23G 1/047; A23G 1/56; A23C 9/156; A23L 27/30; A23V 2002/00
USPC ........................................................ 426/631
See application file for complete search history.

(56) References Cited

U.S. PATENT DOCUMENTS

| 4,597,970 A | 7/1986 | Sharma et al. |
| 4,671,967 A | 6/1987 | Patel et al. |
| 4,722,845 A | 2/1988 | Cherukuri et al. |
| 4,784,866 A | 11/1988 | Wissgott |
| 5,928,691 A | 7/1999 | Reddy et al. |
| 6,537,599 B2 | 3/2003 | Taylor et al. |
| 6,899,911 B2 | 5/2005 | Dewis |
| 7,588,790 B2 | 9/2009 | Kok et al. |
| 7,968,140 B2 | 6/2011 | Kealy et al. |
| 8,263,168 B2 | 9/2012 | Bellody, Jr. et al. |
| 2002/0187231 A1* | 12/2002 | Kok ................. A23L 13/65 426/532 |
| 2003/0215558 A1 | 11/2003 | Kealey et al. |
| 2003/0224097 A1 | 12/2003 | Neri |
| 2004/0171878 A1 | 9/2004 | Kok et al. |
| 2008/0254168 A1* | 10/2008 | Mueller ............ A23L 33/20 426/651 |
| 2009/0311409 A1 | 12/2009 | Luccas et al. |
| 2013/0101722 A1 | 4/2013 | Sepcic et al. |
| 2013/0316050 A1 | 11/2013 | Lincoln et al. |
| 2014/0205729 A1 | 7/2014 | Didzbalis et al. |
| 2016/0000127 A1 | 1/2016 | Didzbalis et al. |
| 2016/0015063 A1 | 1/2016 | Didzbalis et al. |

FOREIGN PATENT DOCUMENTS

| BR | 9707340 A * | 7/1999 | ............. A23G 1/56 |
| CN | 1507431 A | 6/2004 | |
| CN | 101873809 A * | 10/2010 | ............. A24B 13/00 |
| EP | 1366672 A1 | 12/2003 | |
| GB | 366487 * | 1/1931 | |
| RU | 2202213 C2 | 4/2003 | |
| TW | 200423959 A * | 11/2004 | ............ A61K 31/137 |
| WO | WO 02090311 A1 | 11/2002 | |
| WO | WO 2014/116750 A2 | 7/2014 | |
| WO | WO 2014/130649 A1 | 8/2014 | |
| WO | WO 2014/159452 A1 | 10/2014 | |
| WO | PCT/US15/29323 | 5/2015 | |
| WO | PCT/US15/29324 | 5/2015 | |
| WO | PCT/US15/29326 | 5/2015 | |

OTHER PUBLICATIONS

U.S. Appl. No. 61/988,798, filed May 5, 2014, McGrane, et al.
U.S. Appl. No. 62/030,444, filed Jul. 29, 2014, McGrane, et al.
U.S. Appl. No. 15/322,132 US 2017/015363, filed Dec. 26, 2016 Jun. 8, 2017.
U.S. Appl. No. 15/322,132, filed Mar. 1, 2022 Non-Final Office Action.
U.S. Appl. No. 15/322,132, filed Jan. 13, 2022 Withdrawal from Issue.
U.S. Appl. No. 15/322,132, filed Aug. 10, 2021 Issue Fee.
U.S. Appl. No. 15/322,132, filed Jul. 9, 2021 Rule 312 Amendment.
U.S. Appl. No. 15/322,132, filed May 10, 2021 Notice of Allowance.
U.S. Appl. No. 15/322,132, filed Mar. 4, 2021 Resp Response to Final Office Action and Request for Continued Examination.
U.S. Appl. No. 15/322,132, filed Dec. 4, 2020 Final Office Action.
U.S. Appl. No. 15/322,132, filed Aug. 21, 2020 Response to Non-Final Office Action.
U.S. Appl. No. 15/322,132, filed May 21, 2020 Non-Final Office Action.
U.S. Appl. No. 15/322,132, filed Apr. 27, 2020 Response to Non-Final Office Action.

(Continued)

*Primary Examiner* — Erik Kashnikow
*Assistant Examiner* — Bhaskar Mukhopadhyay
(74) *Attorney, Agent, or Firm* — Fish & Richardson P.C.

(57) ABSTRACT

A flavor composition containing at least one, two, or more potassium salt(s) that can be used to enhance an alkalized cocoa flavor profile of edible compositions including sweet goods, such as fat-based confections comprising chocolate or chocolate liquor.

7 Claims, 3 Drawing Sheets

(56) References Cited

OTHER PUBLICATIONS

U.S. Appl. No. 15/322,132, filed Jan. 27, 2020 Non-Final Office Action.
U.S. Appl. No. 15/322,132, filed Oct. 8, 2019 Response to Non-Final Office Action.
U.S. Appl. No. 15/322,132, filed Jul. 8, 2019 Non-Final Office Action.
U.S. Appl. No. 15/322,132, filed May 6, 2019 Response to Final Office Action and Request for Continued Examination.
U.S. Appl. No. 15/322,132, filed Feb. 4, 2019 Final Office Action.
U.S. Appl. No. 15/322,132, filed Sep. 17, 2018 Response to Non-Final Office Action.
U.S. Appl. No. 15/322,132, filed Jun. 15, 2018 Non-Final Office Action.
U.S. Appl. No. 15/322,132, filed Apr. 13, 2018 Response to Final Office Action and Request for Continued Examination.
U.S. Appl. No. 15/322,132, filed Jan. 16, 2018 Final Office Action.
U.S. Appl. No. 15/322,132, filed Dec. 6, 2017 Response to Non-Final Office Action.
U.S. Appl. No. 15/322,132, filed Sep. 7, 2017 Non-Final Office Action.
U.S. Appl. No. 15/322,132, filed Aug. 23, 2017 Response to Restriction Requirement.
U.S. Appl. No. 15/322,132, filed Jul. 27, 2017 Restriction Requirement.
"Cocoa Liquor" retrieved on Aug. 30, 2017.
Lieberman, "Pharmaceutical Dosage Forms: Tablets", vol. 1, Marcel Dekker Inc., New York, NY, 616 pgs, (1989) Abstract.
Meilgaard et al., "The Spectrum Method", Sensory Evaluation Techniques, 3rd Ed., 17 pages (1999).
Minifie, "Chocolate, Cocoa and Confectionery: Science and Technology", 2nd ed. AVI Pub., 142-174 (1980).
Saxelby et al. in Catherine Saxelby's Foodwatch, (2013).
Technifax: Cocoa Alkalization (Dutching and Drying) Litttleford Reactor Advances the Chocolate Industry, Littleford Jay, Inc. retrieved from the internet Jul. 2014, 2 pages.
Miller et al., "Impact of Alkalization on the Antioxidant and Flavanol Content of Commercial Cocoa Powders", Journal of Agricultural and Food Chemistry, vol. 56, pp. 8527-8533, (2008).

* cited by examiner

| K-Acetate (%) | K-Lactate (%) |
|---|---|
| 5.500 | 0.000 |
| 5.330 | 0.171 |
| 5.159 | 0.341 |
| 4.813 | 0.688 |
| 4.125 | 1.375 |
| 2.750 | 2.750 |
| 1.375 | 4.125 |
| 0.688 | 4.813 |
| 0.341 | 5.159 |
| 0.171 | 5.330 |
| 0.000 | 5.500 |

FIGURE 1

FLAVOR COMPOSITIONS CONTAINING POTASSIUM SALTS

CROSS-REFERENCE TO RELATED APPLICATIONS

This application is a divisional of U.S. patent application Ser. No. 15/322,132, filed Dec. 26, 2016, now allowed, which is a national stage application, filed under 35 U.S.C. § 371, of International Application No. PCT/US2015/038053, filed Jun. 26, 2015, which claims the benefit of U.S. Provisional Application No. 62/018,429, filed on Jun. 27, 2014, all of which are hereby incorporated by reference herein.

FIELD

The present application relates to the use of potassium salts to provide an alkalized cocoa flavor profile in a chocolate confection that has not be treated with an alkali. The present application also relates to flavor compositions comprising potassium salts that can be used to enhance or modify the alkalized cocoa flavor profile of various edible compositions such as sweet goods and savory goods. The flavor compositions can include combinations of compounds, and can be added to edible compositions in various delivery system formats.

BACKGROUND

Taste profiles for edible compositions include basic tastes such as sweet, salt, bitter, sour, umami and kokumi. Chemical compounds that elicit these tastes are often referred to as tastants. It is hypothesized that tastants are sensed by taste receptors in the mouth and throat which transmit signals to the brain where the tastants and resulting taste profiles are registered. In addition to taste profiles, edible compositions are also known to have flavor profiles. Chemical compounds that contribute to flavor profiles can be aromatic compounds that are often referred to as flavorants. It is hypothesized that flavorants are sensed by receptors in the mouth, nose, and throat. Taken together, the taste and flavor profiles resulting from the various tastants and flavorants contribute to the sensory experience users have when consuming the edible compositions. The sensory experience can also include various texture and temperature/thermal aspects.

While there have been recent advances in taste and flavor technologies, there remains a need for compounds that can enhance or modify the sensory experience of edible compositions by enhancing or modifying the taste, texture, and/or flavor profiles of edible compositions. The enhancement or modification can be to increase the intensity of a desirable attribute, to replace a desirable attribute that is not present or somehow lost in the edible composition, or to decrease the intensity of an undesirable attribute.

Potassium lactate and potassium acetate are known to be preservatives and flavor enhancers and are approved for use in foods as flavor enhancers. (See, e.g., 21 C.F.R 184.1639 and 21 C.F.R. 172.515). Potassium lactate is a product which is mainly used in the meat industry. It is used in the same application as sodium lactate, namely for shelf life extension and safety enhancement. However, a disadvantage of most potassium salts is their flavor. They cause a bitter aftertaste. (See U.S. Pat. No. 7,588,790). Potassium acetate has also been used in combination with sodium acetate to increase the viscosity of sugar for use in chocolate products. (See GB 366487).

Cocoa is treated with alkali to improve the color of the chocolate and to develop the chocolate flavor. Alkalization is used to treat cacao beans at different stages of the production process as it is made into chocolate. The alkali removes acidity and harshness from the cacao bean and is a common practice in covering up inferior qualities of cheap cacao. By adding alkali salts such as ammonia, potassium, sodium and ammonium carbonate, ammonium and sodium bicarbonate and sodium hydroxide to chocolate, the pH of the chocolate is increased, and the desired color and flavor can be achieved. Following the alkalization process, the chocolate must be dried so that moisture content of the finished product is no more than about 5%.

The alkalization process requires laborious alkalization and drying steps during the production of chocolate confections, and can destroy sensitive cocoa compounds such as cocoa polyphenols. Thus, there remains a need for a method of providing an alkalized cocoa flavor profile that preserves sensitive cocoa compounds, and that can be achieved without the alkalization and drying steps currently utilized.

SUMMARY OF THE INVENTION

The present application is directed to flavor compositions and methods for making and modifying such compositions across a variety of food compositions. Specifically, the present application is directed to compositions comprising one or more potassium salts that can be used to provide an alkalized flavor profile to a food product, such as a chocolate confection, or any fat-based confection.

In certain embodiments, the flavor compositions of the present application comprise potassium lactate.

In certain embodiments, the flavor compositions of the present application comprise potassium acetate.

In certain embodiments, the flavor compositions of the present application comprise potassium lactate and potassium acetate.

In certain embodiments, the ratio of potassium lactate to potassium acetate in a flavor composition is from about 2% to 98% to about 98% to 2%.

In certain embodiments, the present application provides methods of modifying the taste and/or flavor of a food product, which comprises providing a flavor composition, for example, a composition comprising potassium lactate and/or potassium acetate, and admixing the flavor composition with a food product.

In certain embodiments of the present application, the flavor composition is admixed with a food product in an amount effective to provide an alkali flavor profile. In certain embodiments, the food product has not been treated with alkali.

In certain embodiments of the present application, the flavor composition is admixed with a food product in an amount such that the taste profile and/or flavor profile of the food product is not statistically different from an alkalized chocolate.

In certain embodiments of the present application, the flavor composition is admixed with a fat-based confection food product. In certain embodiments, the fat-based confection is chocolate, for example, milk chocolate, white chocolate, dark chocolate or combinations thereof. In certain embodiments, the flavor composition is admixed with a chocolate at a level of from about 0.001% w/w (weight/weight) to about 6.5% w/w, or from about 0.1% w/w to about 6.5% w/w by weight of the chocolate.

In certain embodiments of the present application, the fat-based confection is cocoa liquor. In certain embodiments, the flavor composition is admixed with cocoa liquor at a level of from about 0.1% w/w to about 15% w/w, or from about 1% w/w to about 15% w/w by weight of the cocoa liquor.

In certain embodiments, admixing the flavor composition of the present application with a fat-based confection food product does not decrease the level of cocoa flavanols, for example, polyphenols, present in the food product.

In certain embodiments of the present application, the flavor composition is admixed with a fat-based confection food product in an amount effective to provide an alkalized cocoa flavor profile, wherein the level of cocoa flavanols present in the food product is not statistically different from a fat-based confection food product that has not undergone alkalization. In certain embodiments, the fat-based confection food product that has not undergone alkalization is not admixed with a flavor composition of the present application.

In certain embodiments of the present application, the flavor composition is admixed with a fat-based confection food product in an amount effective to provide an alkalized cocoa flavor profile, wherein the level of cocoa flavanols present in the food product is not different from a fat-based confection food product that has not undergone alkalization. In certain embodiments, the fat-based confection food product that has not undergone alkalization is not admixed with a flavor composition of the present application.

In certain embodiments, the flavor composition is admixed with a food product at a concentration of from about 0.1 to about 100 ppm (parts-per-million), and values in between. In certain embodiments, the flavor composition is admixed with a food product at a concentration of from about 0.1 to about 50 ppm, and values in between. In certain embodiments, the flavor composition is admixed with a food product at a concentration of from about 0.1 to about 10 ppm, and values in between.

In certain embodiments, the flavor composition is admixed with a food product at a concentration of from about 0.01 to about 10000 ppb (parts-per-billion), and values in between. In certain embodiments, the flavor composition is admixed with a food product at a concentration of from about 0.1 to about 1000 ppb, and values in between. In certain embodiments, the flavor composition is admixed with a food product at a concentration of from about 1 to about 100 ppb, and values in between. In certain embodiments, the flavor composition is admixed with a food product at a concentration of from about 10 to about 50 ppb, and values in between. In certain embodiments, the flavor composition is admixed with a food product at a concentration of from about 0.1 to about 10 ppb, and values in between.

In certain embodiments, the flavor composition is admixed with a food product at a concentration of from about 0.1 to about 100 ppt (parts-per-trillion), and values in between. In certain embodiments, the flavor composition is admixed with a food product at a concentration of from about 0.1 to about 50 ppt, and values in between. In certain embodiments, the flavor composition is admixed with a food product at a concentration of from about 0.1 to about 10 ppt, and values in between.

In certain embodiments, the flavor composition is admixed with a food product at a concentration of from about 0.0001 to about 99.9% w/w, and values in between. In certain embodiments, the flavor composition is admixed with a food product at a concentration of from about 0.0001 to about 1.0% w/w, and values in between. In certain embodiments, the flavor composition is admixed with a food product at a concentration of from about 0.0001 to about 0.5% w/w, and values in between.

The present application is also directed methods of creating an alkalized flavor profile in a food composition comprising the steps of providing a food composition mass and adding a flavor composition comprising one or more potassium salts to the composition mass.

In certain embodiments, the methods described herein create an alkalized cocoa flavor profile in a fat-based confectionery, wherein the methods comprise the steps of providing a fat-based confectionery mass and adding a flavor composition comprising one or more potassium salts to the fat-based confectionery mass, for example, potassium lactate, potassium acetate, or a combination thereof. In certain embodiments, the fat-based confectionery mass is a chocolate mass, for example, milk chocolate, white chocolate, dark chocolate or combinations thereof. In certain embodiments, the fat-based confectionery mass is a cocoa liquor. In certain embodiments, the methods described herein do not include an alkalization step.

In certain embodiments, the present disclosure provides for method of maintaining a level of cocoa flavanols in a fat-based confectionery, wherein the methods comprise the steps of providing a fat-based confectionery mass and adding a flavor composition comprising one or more potassium salts to the fat-based confectionery mass, for example, potassium lactate, potassium acetate, or a combination thereof. In certain embodiments, the fat-based confectionery mass is a chocolate mass, for example, milk chocolate, white chocolate, dark chocolate or combinations thereof. In certain embodiments, the fat-based confectionery mass is a cocoa liquor. In certain embodiments, the methods described herein do not include an alkalization step.

The foregoing has outlined rather broadly the features and technical advantages of the present application in order that the detailed description that follows may be better understood. Additional features and advantages of the application will be described hereinafter which form the subject of the claims of the application. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

BRIEF DESCRIPTION OF THE DRAWINGS

FIG. 1 depicts 65% cocoa dark chocolate samples comprising a flavor composition comprising potassium acetate and potassium lactate at different weight/weight percentages by weight of the chocolate in accordance with Example 1;

DETAILED DESCRIPTION

Figure 2:
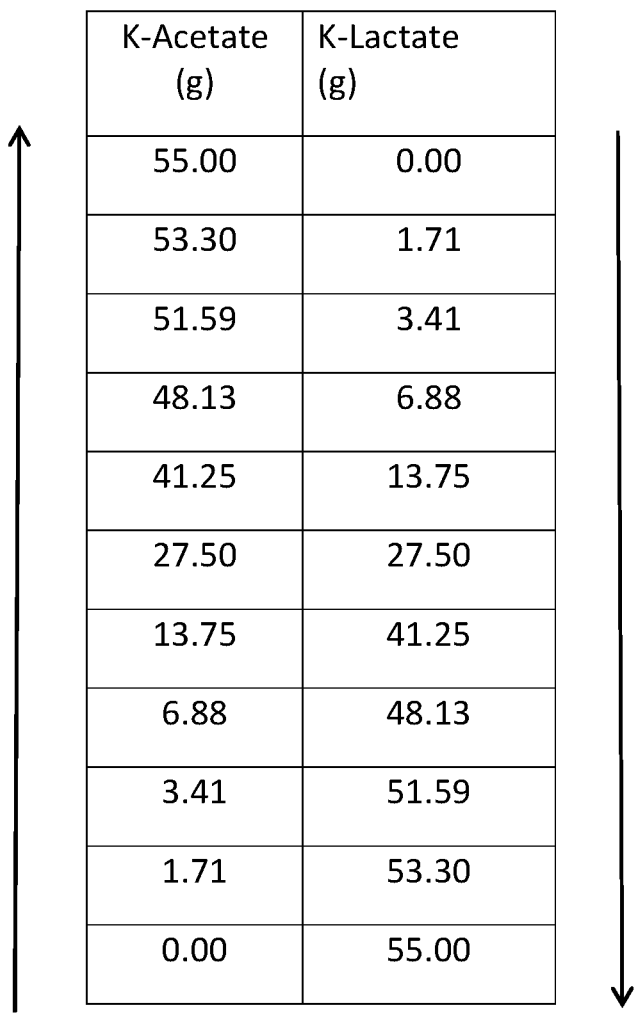
FIG. 2 depicts 1 kg samples of 65% cocoa dark chocolate comprising a flavor composition comprising potassium acetate and potassium lactate present at different masses (grams) in the chocolate samples in accordance with Example 1.

To date, there remains a need for a flavor modifier that can provide a desired level of an alkalized cocoa flavor profile in various edible compositions, for example, fat-based confections such as chocolate and cocoa liquor. The present application relates to flavor compositions that include at least one or more potassium salts. In certain non-limiting embodiments, the potassium salt is potassium lactate, potassium acetate or combination thereof. The flavor compositions can be used to enhance or modify the taste and/or flavor of various edible compositions such as sweet goods and savory goods. The flavor compositions can include combinations of compounds, and can be added to edible compositions in various delivery system formats.

1. Definitions

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1 of a given value. Alternatively, particularly with respect to biological systems or processes, the term can mean within an order of magnitude, preferably within 5-fold, and more preferably within 2-fold, of a value.

As used herein, "taste" refers to a sensation caused by activation or inhibition of receptor cells in a subject's taste buds. In certain embodiments, taste can be selected from the group consisting of sweet, sour, salt, bitter, kokumi and umami. In certain embodiments, a taste is elicited in a subject by a "tastant." In certain embodiments, a tastant is a synthetic tastant. In certain embodiments, the tastant is prepared from a natural source.

As used herein, "taste profile" refers to a combination of tastes, such as, for example, one or more of a sweet, sour, salt, bitter, kokumi and/or umami taste. In certain embodiments, a taste profile is produced by one or more tastant that is present in a composition at the same or different concentrations. In certain embodiments, a taste profile refers to the intensity of a taste or combination of tastes, for example, a sweet, sour, salt, bitter, kokumi and/or umami taste, as detected by a subject or any assay known in the art. In certain embodiments, modifying, changing or varying the combination of tastants in a taste profile can change the sensory experience of a subject.

As used herein, "flavor" refers to one or more sensory stimuli, such as, for example, one or more of taste (gustatory), smell (olfactory), touch (tactile) and temperature (thermal) stimuli. The terms "flavor" and "aroma" are synonymous and are used interchangeably. In certain non-limiting embodiments, the sensory experience of a subject exposed to a flavor can be classified as a characteristic experience for the particular flavor. For example, a flavor can be identified by the subject as being, but not limited to, a floral, citrus, berry, nutty, caramel, chocolate, peppery, smoky, cheesy, meaty, alkali, etc. flavor. As used herein, a flavor composition can be selected from a liquid, dry powder, spray, paste, suspension and any combination thereof. The flavor can be a natural composition, an artificial composition, a nature identical, or any combination thereof.

As used herein, "flavor profile" refers to a combination of sensory stimuli, for example, tastes, such as sweet, sour, bitter, salty, kokumi and/or umami tastes, and/or olfactory, tactile and/or thermal stimuli. In certain embodiments, the flavor profile comprises one or more flavors which contribute to the sensory experience of a subject. In certain embodiments, modifying, changing or varying the combination of stimuli in a flavor profile can change the sensory experience of a subject.

As used herein, "texture profile" or "mouthfeel" refers to a composition's physical and chemical interaction in the mouth. The texture profile of a composition can include one or more texture, such as, for example, but not limited to, astringency, hardness, cohesiveness, viscosity, elasticity, adhesiveness, brittleness, chewiness, gumminess, moisture content, grittiness, smoothness, oiliness and greasiness. In certain embodiments, the texture profile can comprise one or more texture characteristic in the same or different intensities. In certain embodiments, the texture profile can remain constant or change during a sensory experience, for example, from initial perception of a composition on the palate, to first bite, through mastication and finally, the act of swallowing.

As used herein, "sensory experience" refers to a subject's sensory perception of a taste, taste profile, flavor, flavor profile or texture profile.

As used herein, "ppt" means parts-per-trillion and is a weight relative parameter. A part-per-trillion is a picogram per gram, such that a component that is present at 10 ppt is present at 10 picograms of the specific component per 1 gram of the aggregate mixture.

As used herein, "ppb" means parts-per-billion and is a weight relative parameter. A part-per-billion is a nanogram per gram, such that a component that is present at 10 ppb is present at 10 nanograms of the specific component per 1 gram of the aggregate mixture.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein "admixing," for example, "admixing the flavor composition of the present application with a food product," refers to the process where the flavor composition is mixed with or added to the completed product or mixed with some or all of the components of the product during product formation or some combination of these steps. When used in the context of admixing the term "product" refers to the product or any of its components. This admixing step can include a process selected from the step of adding the flavor composition to the product, spraying the flavor composition on the product, coating the flavor composition on the product, suspending the product in the flavor composition, painting the flavor composition on the product, pasting the flavor composition on the product, encapsulating the product with the flavor composition, mixing the flavor composition with the product and any combination thereof. The flavor composition can be a liquid, dry powder, spray, paste, suspension and any combination thereof.

As used herein "food product" refers to an ingestible product, such as, but not limited to, human food, animal (pet) foods, and pharmaceutical compositions.

As used herein "flavor composition" refers to at least one, two, three, four, five, or more compounds or biologically acceptable salts thereof that modulate, including enhancing, multiplying, potentiating, decreasing, suppressing, or inducing, the tastes, smells and/or flavors of a natural or synthetic tastant, flavoring agent, taste profile, flavor profile and/or texture profile in an animal or a human. In certain embodiments, the flavor composition comprises a combination of compounds or biologically acceptable salts thereof. In certain embodiments, the flavor composition includes one or more excipients.

2. Flavor Compositions

The present application relates to flavor compositions that include at least one, two, or more potassium salts. In certain non-limiting embodiments, the potassium salt is potassium lactate, potassium acetate, or combination thereof. The flavor compositions can be used to enhance or modify the taste or flavor of various edible compositions such as sweet goods and savory goods. The flavor compositions can include combinations of compounds, and can be added to edible compositions in various delivery system formats. In certain embodiments, the flavor composition is admixed to an edible composition such as chocolate to provide an alkalized flavor profile.

In certain embodiments, the flavor composition can be combined with one or more other flavor modifying agent, for example, a flavor composition as described by Internationals Application Nos. PCT/US14/012611 (filed Jan. 22, 2014, and published as International Publication No. WO/2014/116750), PCT/US14/023727 (filed Mar. 11, 2014, and published as International Publication No. WO/2014/159452), PCT/US14/017354 (filed Feb. 20, 2014, and published as International Publication No. WO/2014/130649), PCT/US15/29323 (filed May 5, 2015), PCT/US15/29324 (field May 5, 2015), and PCT/US15/29326 (filed May 5, 2015); and U.S. application Ser. Nos. 14/161,508 (filed Jan. 22, 2014, and published as U.S. Publication No. 2014/0205729), 61/988,798 (filed May 5, 2014), and 62/030,444 (filed Jul. 29, 2014); each of which is hereby incorporated by reference in its entirety for all purposes.

In certain embodiments, the flavor compositions of the present application are combined with other salt or salt mixtures. The salt or salt mixture can comprise inorganic, organic, monoatomic as well as polyatomic ions. In certain embodiments, the salts are nontoxic and edible. In certain embodiments, the salt or salt mixtures are inorganic salts, for example, inorganic salts comprising halogen anions or phosphate ions, alkali or earth alkali metal salts. In certain embodiments, the salts are cationic salts such as, but not limited to, NaCl, KCl and $Na_3PO_4$. In certain embodiments, the salts are anionic salts such as, but not limited to acetate salt, TFA salt, and formate salt.

The flavor compositions of the present application can be used to enhance or modify the sensory experience of various edible compositions such as sweet goods and savory goods. The flavor compositions can include combinations of compounds, and can be added to edible compositions in various delivery system formats.

In certain embodiments, the application relates to methods for modulating the flavor of an edible product comprising: a) providing at least one comestible food product, or a precursor thereof, and b) combining the comestible food product or precursor thereof with at least an alkali flavor modulating amount of at least one, two, or more flavor composition(s), for example a flavor composition comprising potassium lactate, potassium acetate, or combination thereof, so as to form a modified edible food product.

In certain embodiments, the flavor compositions of the present application can create an alkalized flavor profile, such as, for example, an alkalized cocoa flavor profile, of a food product, such as, for example, an edible composition including pharmaceutical compositions and human foods, such as a confection, and/or a snack food. In certain embodiments, the flavor compositions of the present application can be used to create an alkalized flavor profile in one or more of the following subgenuses of comestible compositions: confectioneries, bakery products, ice creams, dairy products, savory snacks, snack bars, meal replacement products, ready meals, soups, pastas, noodles, canned foods, frozen foods, dried foods, chilled foods, oils and fats, baby foods, or spreads, or a mixture thereof.

In certain embodiments, the comestible composition is a fat-based confection. In certain embodiments, the fat-based confection is a chocolate. In certain embodiments, the fat-based confection is cocoa liquor.

In certain embodiments, at least a taste and/or flavor and/or mouthfeel modulating amount of one, two, or more of the flavor compositions of the present application can be added to the edible food product, so that the taste and/or flavor and/or mouthfeel, for example, alkali flavor, modified edible food product has an increased or decreased taste and/or flavor and/or mouthfeel, for example, alkali flavor, as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide an alkalized cocoa flavor profile.

In certain embodiments, admixing the flavor composition of the present application with a fat-based confection food product does not decrease the level of cocoa flavanols present in the food product.

In certain embodiments, the cocoa flavanols comprise polyphenols.

In certain embodiments of the present application, the flavor composition is admixed with a fat-based confection food product in an amount effective to provide an alkalized cocoa flavor profile, wherein the level of cocoa flavanols present in the food product is not statistically different from a fat-based confection food product that has not undergone alkalization. In certain embodiments, the fat-based confection food product that has not undergone alkalization is not admixed with a flavor composition of the present application.

In certain embodiments of the present application, the flavor composition is admixed with a fat-based confection food product in an amount effective to provide an alkalized cocoa flavor profile, wherein the level of cocoa flavanols present in the food product is not different from a fat-based confection food product that has not undergone alkalization. In certain embodiments, the fat-based confection food product that has not undergone alkalization is not admixed with a flavor composition of the present application.

In certain embodiments of the application, an edible composition can be produced that contains a sufficient amount of at least one, two, or more flavor composition(s) to produce a composition having the desired flavor or taste characteristics such as an "alkali" flavor.

In certain embodiments, at least an alkali flavor modulating amount of one, two, or more of the flavor compositions of the present application can be added to the edible food product, so that the alkali flavor modified edible food product has an increased or decreased alkali flavor as compared to the edible food product prepared without the flavor composition, as determined by human beings or animals in general, or in the case of formulation testing, as determined by a taste panel of at least one, two, three, four, five or more human taste testers, via procedures known in the art.

In certain embodiments of the present application, the flavor composition is added to a food product in an amount effective to provide an alkali flavor.

In certain embodiments, adding flavor compositions of the present application to a fat-based confection, such as a chocolate confectionery product made from cacao and/or cocoa beans, provides the same alkalized cocoa flavor profile as a chocolate confectionery made from alkalized chocolate, such as dutch chocolate, or alkalized cocoa liquor.

In certain embodiments, adding flavor compositions of the present application to a fat-based confection, such as a chocolate confectionery product made from cacao and/or cocoa beans, provides an alkalized cocoa flavor profile that is not statistically different from an alkalized chocolate flavor profile of a chocolate confectionery made from alkalized chocolate, such as dutch chocolate, or an alkalized cocoa liquor.

In certain embodiments, the flavor composition of the present application can be combined with an edible composition in an amount effective to modify, enhance or otherwise alter a flavor or flavor profile of the edible composition. The modification can include, for example, an increase or decrease in the perception of one or more sensory stimuli, such as, for example, one or more of taste (gustatory), smell (olfactory), touch (tactile) and temperature (thermal).

In certain embodiments, the flavor composition of the present application can be combined with an edible composition in an amount effective to modify, enhance or otherwise alter a texture profile of the edible composition.

In certain embodiments of the application, an edible composition can be produced that contains a sufficient amount of at least one, two, or more flavor composition(s) to produce an edible composition having a flavor attribute intensity that is the same as, or not significantly different than, or similar to, an edible composition prepared without the flavor composition, as determined by human beings or animals in general, or in the case of formulation testing, as determined by a taste panel of at least one, two, three, four, five or more human taste testers, via procedures known in the art. In certain embodiments, the edible composition the flavor compositions are added to comprises a non-alkalized chocolate or chocolate liquor, and the edible composition prepared without the flavor composition comprises an alkalized chocolate or chocolate liquor.

In a non-limiting embodiment, the edible composition comprising the flavor composition has a flavor attribute intensity that is between about 0.1 and about 100 of the attribute intensity of the edible composition prepared without the flavor composition. In other embodiments, the attribute intensity of the edible composition comprising the flavor composition is between about 1 and about 90%, or between about 10 and about 80%, or between about 20 and about 70%, or between about 30 and about 60%, or between about 40 and about 50 of the attribute intensity of the edible composition prepared without the flavor composition.

In yet other non-limiting embodiments, the attribute intensity of the edible composition comprising the flavor composition is at least 1%, 5%, 10%, 15%, 20%, 25%, 30%, 35%, 40%, 45%, 50%, 55%, 60%, 65%, 70%, 75%, 80%, 85%, 90%, 95%, 99% or 100% of the attribute intensity of the edible composition prepared without the flavor composition.

In one non-limiting embodiment, the flavor attribute comprises one, two, three, four, five or more individual flavor attributes. The flavor attributes can be evaluated, for example, by comparing the edible composition prepared with the flavor composition, and the edible composition prepared without the flavor composition, to a flavor attribute reference standard.

In other embodiments, the flavor attribute is a blend of all the individual flavor attributes present or detectable in the edible composition.

In one specific, non-limiting embodiment, the flavor attribute comprises an alkalized/bicarbonate attribute.

The concentration of flavor composition admixed with an edible food product to modulate or improve the flavor of the edible food product or composition can vary dependent on variables, such as, for example, the specific type of edible composition, what salty, umami, kokumi, savory, bitter, sweet, sour, flinty/mineral, metallic, numbing, alkali and/or astringent compounds are already present in the edible food product and the concentrations thereof, and the enhancer effect of the particular flavor composition on such salty, umami, kokumi, savory, bitter, sweet, sour, flinty/mineral, metallic, numbing, alkali and/or astringent compounds.

In certain embodiments, admixing the flavor compositions of the present application with an edible food product modulates, for example, enhances, the alkalized flavor of other natural or synthetic alkali flavorants.

As described herein, the flavor compositions of the present disclosure can include one or more potassium salts, for example, potassium acetate and potassium lactate. As such, in non-limiting embodiments, the concentrations and amounts of flavor compositions described herein can refer to the concentration of each independent potassium salt, or to the total concentration of potassium salts in the flavor composition.

In certain embodiments of the present application, the flavor composition is admixed with a food product, wherein the flavor composition is present in an amount of between about 0.001 and about 20% w/w (weight/weight by weight of the food product, e.g., chocolate), or between about 0.01 and about 20% w/w, or between about 0.05 and about 19% w/w, or between about 0.1 and about 18% w/w, or between about 0.5 and about 17% w/w, or between about 1 and about 16% w/w, or between about 1.5 and about 15% w/w, or between about 2 and about 14% w/w, or between about 2.5 and about 13% w/w, or between about 3 and about 12% w/w, or between about 3.5 and about 11% w/w, or between about 4 and about 10% w/w, or between about 4.5 and about 9% w/w, or between about 5 and about 8% w/w, or between about 5.5 and about 7.5% w/w, or between about 6 and about 7% w/w, and values in between.

In certain embodiments, the food product is chocolate, and the flavor composition is admixed with the chocolate in an amount between about 0.001 and about 15% w/w, or between about 0.01 and about 10% w/w, or between about 0.01 and about 6.5% w/w, or between about 0.5 and about 6.5% w/w, or between about 0.1 and about 5.5% w/w, and values in between. In a specific non-limiting embodiment, the flavor composition is admixed with the chocolate in an amount between about 0.1 and about 6.5% w/w. In other embodiments, the flavor composition is admixed with the chocolate in an amount between about 0.1 and about 6% w/w, or between about 0.2 and about 5.5% w/w, or between about 0.3 and about 4% w/w, or between about 0.3 and about 3% w/w.

In certain embodiments, the food product is cocoa liquor, and the flavor composition is admixed with the cocoa liquor in an amount between about 0.01 and about 20% w/w, or between about 0.1% w/w and about 15% w/w, or between about 1 and about 15% w/w, or between about 1 and about 10% w/w, or between about 1 and about 5% w/w, or between about 0.5 and about 1% w/w, or between about 0.1 and about 10% w/w, and values in between.

In certain embodiments, the flavor composition of the present application comprises a mixture of potassium lactate and potassium acetate. In certain embodiments, the ratio of potassium lactate to potassium acetate in a flavor composition (e.g., the ratio of % w/w of each salt in the mixture) is from about 0.01:99.99%, or about 0.5:99.5%, or about 1:99%, or about 2:98%, or about 5:95%, or about 10:90%, or about 15:85%, or about 20:80%, or about 25:75%, or about 30:70%, or about 35:65%, or about 40:60%, or about 45:55%, or about 50:50%, to about 99.99:0.01%, or about 99.5:0.5%, or about 99:1%, or about 98:2%, or about 95:5%, or about 90:10%, or about 85:15%, or about 80:20%, or about 75:25%, or about 70:30%, or about 65:35%, or about 60:40%, or about 55:45%, or about 50:50%, and values in between.

A broad range of concentrations of the flavor compositions can be employed to provide such alkali flavor modification. In certain embodiments of the present application, the flavor composition is admixed with a food product wherein the flavor composition is present in an amount of from about 0.001 to about 500 ppt, or from about 0.005 to about 250 ppt, or from about 0.01 to about 200 ppt, or from about 0.05 to about 150 ppt, or from about 0.1 to about 100 ppt, or from about 0.5 to about 50 ppt, and values in between.

In certain embodiments, the flavor composition is admixed with a food product at a concentration of from about 0.1 to about 100 ppt, and values in between. In certain embodiments, the flavor composition is admixed with a food product at a concentration of from about 0.1 to about 50 ppt, and values in between. In certain embodiments, the flavor composition is admixed with a food product at a concentration of from about 0.1 to about 10 ppt, and values in between.

In certain embodiments, the flavor composition is admixed with a food product at a concentration of from about 0.1 to about 100 ppt, or from about 1 to about 90 ppt, or from about 10 to about 80 ppt, or from about 20 to about 70 ppt, or from about 30 to about 60 ppt, or from about 40 to about 50 ppt, and values in between.

In certain embodiments, the flavor composition is admixed with a food product at a concentration of from about 0.1 to about 1 ppt, from about 1 to about 5 ppt, from about 5 to about 10 ppt, from about 10 to about 15 ppt, from about 15 to about 20 ppt, from about 20 to about 25 ppt, from about 25 to about 30 ppt, from about 30 to about 35 ppt, from about 35 to about 40 ppt, from about 40 to about 45 ppt, from about 45 to about 50 ppt, from about 50 to about 55 ppt, from about 55 to about 60 ppt, from about 60 to about 65 ppt, from about 65 to about 70 ppt, from about 70 to about 75 ppt, from about 75 to about 80 ppt, from about 80 to about 85 ppt, from about 85 to about 90 ppt from about 90 to about 95 ppt, or from about 95 to about 100 ppt, and values in between, and values in between.

In certain embodiments of the present application, the flavor composition is admixed with a food product wherein the flavor composition is present in an amount of from about 0.001 to about 500 ppb, or from about 0.005 to about 250 ppb, or from about 0.01 to about 200 ppb, or from about 0.05 to about 150 ppb, or from about 0.1 to about 100 ppb, or from about 0.5 to about 50 ppb, and values in between.

In certain embodiments, the flavor composition is admixed with a food product at a concentration of from about 0.01 to about 10000 ppb, and values in between. In certain embodiments, the flavor composition is admixed with a food product at a concentration of from about 0.1 to about 1000 ppb, and values in between. In certain embodiments, the flavor composition is admixed with a food product at a concentration of from about 1 to about 100 ppb, and values in between. In certain embodiments, the flavor composition is admixed with a food product at a concentration of from about 10 to about 50 ppb, and values in between. In certain embodiments, the flavor composition is admixed with a food product at a concentration of from about 0.1 to about 10 ppb, and values in between.

In certain embodiments, the flavor composition is admixed with a food product at a concentration of from about 0.1 to about 10000 ppb, or from about 1 to about 5000 ppb, or from about 10 to about 2000 ppb, or from about 20 to about 1500 ppb, or from about 30 to about 1000 ppb, or from about 40 to about 500 ppb, or from about 50 to about 250 ppb, or from about 60 to about 200 ppb, or from about 70 to about 150 ppb, or from about 80 to about 100 ppb, and values in between.

In certain embodiments, the flavor composition is admixed with a food product at a concentration of from about 0.1 to about 1 ppb, from about 1 to about 5 ppb, from about 5 to about 10 ppb, from about 10 to about 15 ppb, from about 15 to about 20 ppb, from about 20 to about 25 ppb, from about 25 to about 30 ppb, from about 30 to about 35 ppb, from about 35 to about 40 ppb, from about 40 to about 45 ppb, from about 45 to about 50 ppb, from about 50 to about 55 ppb, from about 55 to about 60 ppb, from about 60 to about 65 ppb, from about 65 to about 70 ppb, from about 70 to about 75 ppb, from about 75 to about 80 ppb, from about 80 to about 85 ppb, from about 85 to about 90 ppb from about 90 to about 95 ppb, from about 95 to about 100 ppb, from about 100 to about 150 ppb, from about 150 to about 200 ppb, from about 200 to about 250 ppb, from about 250 to about 300 ppb, from about 300 to about 350 ppb, from about 350 to about 400 ppb, from about 400 to about 450 ppb, from about 450 to about 500 ppb, from about 500 to about 550 ppb, from about 550 to about 600 ppb, from about 600 to about 650 ppb, from about 650 to about 700 ppb, from about 700 to about 750 ppb, from about 750 to about 800 ppb, from about 800 to about 850 ppb, from about 850 to about 900 ppb, from about 900 to about 950 ppb, or from about 950 to about 1000 ppb, and values in between.

In certain embodiments, the flavor composition is admixed with a food product at a concentration of about 0.1 ppb, 0.5 ppb, 1 ppb, 10 ppb, 40 ppb, 50 ppb, 100 ppb, 250 ppb, 267 ppb, 1000 ppb or 1150 ppb.

In certain embodiments, the range of concentrations can include from about 1 ppb to about 100 ppb, less than 100 ppb, at least 30 ppb, and from about 30 ppb to about 1% w/w by weight of the edible composition.

In certain embodiments, the flavor composition is admixed with a food product in an amount effective to increase an alkalized flavor profile perception of an alkali flavor reference by about 1 to about 10 fold, or from about 1.25 to about 8 fold, or from about 1.5 to about 6 fold, or from about 1.75 to about 4 fold, or from about 2 to about 2.5 fold, and values in between.

In certain embodiments of the present application, the flavor composition is admixed with a food product wherein the flavor composition is present in an amount of from between about 0.1 to about 100 ppb, and values in between.

In certain embodiments of the present application, the flavor composition is admixed with a food product wherein the flavor composition is present in an amount of from about 0.001 ppm to 100 ppm, or narrower alternative ranges from about 0.1 ppm to about 10 ppm, from about 0.01 ppm to about 30 ppm, from about 0.05 ppm to about 15 ppm, from about 0.1 ppm to about 5 ppm, or from about 0.1 ppm to about 3 ppm, and values in between.

In certain embodiments, the flavor composition is admixed with a food product at a concentration of from about 0.1 to about 100 ppm, and values in between. In certain embodiments, the flavor composition is admixed with a food product at a concentration of from about 0.1 to about 50 ppm, and values in between. In certain embodiments, the flavor composition is admixed with a food product at a concentration of from about 0.1 to about 10 ppm, and values in between.

In certain embodiments, the flavor composition is admixed with a food product at a concentration of from about 0.1 to about 100 ppm, or from about 1 to about 90 ppm, or from about 10 to about 80 ppm, or from about 20 to about 70 ppm, or from about 30 to about 60 ppm, or from about 40 to about 50 ppm, and values in between.

In certain embodiments, the flavor composition is admixed with a food product at a concentration of from about 0.1 to about 1 ppm, from about 1 to about 5 ppm, from about 5 to about 10 ppm, from about 10 to about 15 ppm, from about 15 to about 20 ppm, from about 20 to about 25 ppm, from about 25 to about 30 ppm, from about 30 to about 35 ppm, from about 35 to about 40 ppm, from about 40 to about 45 ppm, from about 45 to about 50 ppm, from about 50 to about 55 ppm, from about 55 to about 60 ppm, from about 60 to about 65 ppm, from about 65 to about 70 ppm, from about 70 to about 75 ppm, from about 75 to about 80 ppm, from about 80 to about 85 ppm, from about 85 to about 90 ppm from about 90 to about 95 ppm, or from about 95 to about 100 ppm, and values in between.

In certain embodiments, the flavor composition is admixed with a food product at a concentration of from about 0.0001 to about 99.9% weight/weight (w/w), and values in between. In certain embodiments, the flavor composition is admixed with a food product at a concentration of from about 0.0001 to about 1.0% w/w, and values in between. In certain embodiments, the flavor composition is admixed with a food product at a concentration of from about 0.0001 to about 0.5% w/w, and values in between.

In certain embodiments, the flavor composition is admixed with a food product at a concentration of from about 0.0001 to about 99.9% w/w, or from 0.001 to about 99% w/w, or from about 0.01 to about 95% w/w, or from about 0.1 to about 90% w/w, or from about 0.5 to about 85% w/w, or from about 1 to about 80% w/w, or from about 1.5 to about 75% w/w, or from about 2 to about 70% w/w, or from about 2.5 to about 65% w/w, or from about 3 to about 60% w/w, or from about 3.5 to about 55% w/w, or from about 4 to about 50% w/w, or from about 5 to about 45% w/w, or from about 10 to about 40% w/w, or from about 15 to about 35% w/w, or from about 20 to about 30% w/w, and values in between.

In certain embodiments of the present application, the flavor composition is admixed with a food product wherein the flavor composition is present in an amount of from about 0.0000001 to about 99.999% weight/weight (w/w), or from about 0.00005 to about 75% w/w, or from about 0.0001 to about 50% w/w, or from about 0.0005 to about 25% w/w, or from about 0.001 to about 10% w/w, or from about 0.005 to about 5% w/w of the food product, and values in between.

In certain embodiments, the flavor composition is admixed with a food product in an effective amount, such that a subject would be able to tell the food product apart from a food product prepared without the flavor composition, wherein the subject is a human being or animal in general, or in the case of formulation testing, as determined by a taste panel of at least one, two, three, four, five or more human taste testers, via procedures known in the art.

In certain embodiments, the flavor composition is admixed with a food product in an amount effective to increase or decrease a taste and/or flavor and/or mouthfeel in a subject that persists after the food product is no longer in contact with the mouth, tongue and/or throat of a subject. In certain embodiments, the increase or decrease persists for between about 0.5 and about 15 minutes, or between about 2 and about 13 minutes, or between about 4 and about 11 minutes, or between about 6 and about 9 minutes.

In certain embodiments, potassium lactate and potassium acetate are blended together in various ratios or are blended together with other compounds to form various flavor compositions. In certain embodiments, the flavor composition comprises one, two, or more potassium salts in combination with one or more additional compound with similar solubilities as the potassium salts. Table 1 below provides non-limiting examples of flavor compositions comprising potassium salts, such as potassium lactate and/or potassium acetate in combination with other additional compounds.

TABLE 1

Flavor Compositions ("F1.")

| Ingredient | Fl. 1 % w/w | Fl. 2 % w/w | Fl. 3 % w/w | Fl. 4 % w/w | Fl. 5 % w/w | Fl. 6 % w/w | Fl. 7 % w/w | Fl. 8 % w/w |
|---|---|---|---|---|---|---|---|---|
| Potassium Lactate | 0-99.999 | 0-99.999 | 0-99.999 | 0-99.999 | 0-99.999 | 0-99.999 | 0-99.999 | 0-99.999 |

TABLE 1-continued

Flavor Compositions ("Fl.")

| Ingredient | Fl. 1 % w/w | Fl. 2 % w/w | Fl. 3 % w/w | Fl. 4 % w/w | Fl. 5 % w/w | Fl. 6 % w/w | Fl. 7 % w/w | Fl. 8 % w/w |
|---|---|---|---|---|---|---|---|---|
| Potassium Acetate | 0-99.999 | 0-99.999 | 0-99.999 | 0-99.999 | 0-99.999 | 0-99.999 | 0-99.999 | 0-99.999 |
| Hydrolyzed cocoa powder | 0-99.999 | 0-99.999 | 0-99.999 | 0-99.999 | 0-99.999 | 0-99.999 | 0-99.999 | 0-99.999 |
| Hydrolyzed wheat protein | 0-99.999 | 0-99.999 | 0-99.999 | 0-99.999 | 0-99.999 | 0-99.999 | 0-99.999 | 0-99.999 |
| Hydrolyzed soy protein | 0-99.999 | 0-99.999 | 0-99.999 | 0-99.999 | 0-99.999 | 0-99.999 | 0-99.999 | 0-99.999 |
| Vanilla Extract | 0-99.999 | 0-99.999 | 0-99.999 | 0-99.999 | 0-99.999 | 10-18 | 0-99.999 | 0-99.999 |
| Ethyl vanillin | 0-99.999 | 0-99.999 | 0-99.999 | 0-99.999 | 12-16 | 0-99.999 | 0-99.999 | 0-99.999 |
| Ethyl maltol | 0-99.999 | 0-99.999 | 0-99.999 | 0-99.999 | 0-99.999 | 0-99.999 | 0-99.999 | 0-99.999 |
| Isoamyl acetate | 0-99.999 | 0-99.999 | 0-99.999 | 0-99.999 | 0-99.999 | 0-99.999 | 2-3 | 0-99.999 |
| Ethyl acetate | 0-99.999 | 0-99.999 | 0-99.999 | 0-99.999 | 0-99.999 | 0-99.999 | 0-99.999 | 0-99.999 |
| Furaneol | 0-99.999 | 0-99.999 | 0-99.999 | 0-99.999 | 5-8 | 0-99.999 | 0-99.999 | 0-99.999 |
| Myrcene | 0-99.999 | 0-99.999 | 0-99.999 | 0-99.999 | 0-99.999 | 0-99.999 | 1-2 | 0-99.999 |
| Linalool | 0-99.999 | 0-99.999 | 0-99.999 | 0-99.999 | 0-99.999 | 1-3 | 0-99.999 | 0-99.999 |
| Citral | 0-99.999 | 0-99.999 | 0-99.999 | 0-99.999 | 0-99.999 | 0-99.999 | 0-99.999 | 0-99.999 |
| Geraniol | 0-99.999 | 0-99.999 | 0-99.999 | 0-99.999 | 0-99.999 | 1-3 | 0-99.999 | 0-99.999 |
| Acetic acid | 0-99.999 | 0-99.999 | 0-99.999 | 0-99.999 | 0-99.999 | 0-99.999 | 0-99.999 | 0-99.999 |
| Butyric acid | 0-99.999 | 0-99.999 | 0-99.999 | 0-99.999 | 0-99.999 | 6-8 | 0-99.999 | 0-99.999 |
| Citric acid | 0-99.999 | 0-99.999 | 0-99.999 | 0-99.999 | 0-99.999 | 0-99.999 | 95-98 | 42-48 |
| Lactic acid | 0-99.999 | 0-99.999 | 0-99.999 | 0-99.999 | 50-65 | 70-80 | 0-99.999 | 0-99.999 |
| Malic acid | 0-99.999 | 0-99.999 | 0-99.999 | 0-99.999 | 0-99.999 | 0-99.999 | 0-99.999 | 28-32 |
| Tartaric acid | 0-99.999 | 0-99.999 | 0-99.999 | 0-99.999 | 0-99.999 | 0-99.999 | 0-99.999 | 20-25 |
| Other base flavor compounds | 0-99.999 | 0-99.999 | 0-99.999 | 0-99.999 | 0-99.999 | 0-99.999 | 0-99.999 | 0-99.999 |

3. End Product Systems

The flavoring compositions of the presently disclosed subject matter can be used in a wide variety of ingestible vehicles. Non-limiting examples of suitable ingestible vehicles include fat-based confections such as chocolate and cocoa liquor. The combination of the flavoring composition of the presently disclosed subject matter together with an ingestible vehicle and optional ingredients, when desired, provides a flavoring agent that possesses unexpected taste, flavor and/or texture value and imparts, for example, an alkalized cocoa sensory experience.

In the method for flavoring an ingestible composition of the presently disclosed subject matter, the ingestible composition is prepared by admixing the flavoring agent in an ingestible vehicle, together with any optional ingredients, to form, for example, a uniform mixture. The final compositions are readily prepared using standard methods and apparatus generally known by those skilled in the corresponding arts, such as confectionery arts. The apparatus useful in accordance with the presently disclosed subject matter comprises mixing apparatus well known in the art, and therefore the selection of the specific apparatus will be apparent to the artisan.

In certain embodiments, the present application relates to the modified edible food products produced by the methods disclosed herein. In certain embodiments, the food products can be produced by processes for producing comestible products well known to those of ordinary skill in the art, wherein the flavor composition of the present application is employed as an alkali flavorant enhancer for the food product.

3.1 Chocolates and Fillings

The presently disclosed subject matter is also used with and/or in chocolate products, chocolate-flavored confections, and chocolate flavored compositions. Chocolates also include those containing crumb solids or solids fully or partially made by a crumb process. Various chocolates are disclosed, for example, in U.S. Pat. Nos. 7,968,140 and 8,263,168, the disclosures of which are incorporated herein by reference in their entireties. A general discussion of the composition and preparation of chocolate confections can be found in B. W. Minifie, Chocolate, Cocoa and Confectionery: Science and Technology, 2nd edition, AVI Publishing Co., Inc., Westport, Conn. (1982), which disclosure is incorporated herein by reference.

The term "chocolate" as used herein refers to a solid or semi-plastic food and is intended to refer to all chocolate or chocolate-like compositions containing a fat-based component phase or fat-like composition. The term is intended to include standardized or nonstandardized compositions conforming to the U.S. Standards Of Identity (SOI), CODEX Alimentarius and/or other international standards and compositions not conforming to the U.S. Standards Of Identity or other international standards. The term includes dark chocolate, baking chocolate, sweet chocolate, bittersweet or semisweet chocolate, milk chocolate, buttermilk chocolate, skim milk chocolate, mixed dairy product chocolate, white chocolate, sweet cocoa and vegetable fat coating, sweet chocolate and vegetable fat coating, milk chocolate and vegetable fat coating, vegetable fat based coating, pastels including white chocolate or coating made with cocoa butter or vegetable fat or a combination of these, nutritionally modified chocolate-like compositions (chocolates or coatings made with reduced calorie ingredients) and low fat chocolates, aerated chocolates, compound coatings, non-standardized chocolates and chocolate-like compositions, unless specifically identified otherwise.

Nonstandardized chocolates result when, for example, the nutritive carbohydrate sweetener is replaced partially or completely; or when the cocoa butter, cocoa butter alternative, cocoa butter equivalent, cocoa butter extender, cocoa butter replacer, cocoa butter substitute or milkfat are replaced partially or completely; or when components that have flavors that imitate milk, butter or chocolate are added or other additions or deletions in formula are made outside the FDA standards of identify of chocolate or combinations thereof. Chocolate-like compositions are those fat-based compositions that can be used as substitutes for chocolate in applications such as panning, molding, or enrobing; for example, carob.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions that fall outside the specified ranges of the standardized chocolates.

The chocolate can contain a sugar syrup/solids, invert sugar, hydrolyzed lactose, maple sugar, brown sugar, molasses, honey, sugar substitute and the like. The term "sugar substitute" includes bulking agents, sugar alcohols (polyols such as glycerol), or high potency sweeteners or combinations thereof. Nutritive carbohydrate sweeteners with varying degrees of sweetness intensity can be any of those typically used in the art and include, but are not limited to, sucrose, e.g. from cane or beet, dextrose, fructose, lactose, maltose, glucose syrup solids, corn syrup solids, invert sugar, hydrolyzed lactose, honey, maple sugar, brown sugar, molasses and the like. Sugar substitutes can partially replace the nutritive carbohydrate sweetener. High potency sweeteners include aspartame, cyclamates, saccharin, acesulfame-K, neohesperidin dihydrochalcone, sucralose, alitame, *stevia* sweeteners, glycyrrhizin, thaumatin and the like and mixtures thereof. The preferred high potency sweeteners are aspartame, cyclamates, saccharin, and acesulfame-K. Examples of sugar alcohols can be any of those typically used in the art and include sorbitol, mannitol, xylitol, maltitol, isomalt, lactitol and the like.

The chocolates can also contain bulking agents. The term "bulking agents" as defined herein can be any of those typically used in the art and include polydextrose, cellulose and its derivatives, maltodextrin, gum arabic, and the like.

The chocolate products can contain emulsifiers. Examples of safe and suitable emulsifiers can be any of those typically used in the art and include lecithin derived from vegetable sources such as soybean, safflower, corn, etc., fractionated lecithins enriched in either phosphatidyl choline or phosphatidyl ethanolamine, or both, mono- and digylcerides, diacetyl tartaric acid esters of mono- and diglycerides (also referred to as DATEM), monosodium phosphate derivatives of mono- and diglycerides of edible fats or oils, sorbitan monostearate, hydroxylated lecithin, lactylated fatty acid esters of glycerol and propylene glycol, polyglycerol esters of fatty acids, propylene glycol mono- and di-esters of fats and fatty acids, or emulsifiers that can become approved for the US FDA-defined soft candy category. In addition, other emulsifiers that can be used include polyglycerol polyricinoleate (PGPR), ammonium salts of phosphatidic acid, (e.g. YN) sucrose esters, oat extract, etc., any emulsifier found to be suitable in chocolate or similar fat/solid system or any blend.

The term "chocolate-flavored confection" refers to food products, excluding "chocolate", having a chocolate flavor/aroma and comprising a cocoa fraction. These products are stable at ambient temperatures for extended periods of time (e.g., greater than 1 week) and are characterized as microbiologically shelf-stable at 18-30° C. under normal atmospheric conditions. Examples include chocolate-flavored hard candies, chewables, chewing gums, etc.

The term "chocolate-flavored compositions" refers to chocolate-flavored compositions, excluding "chocolate", containing a cocoa fraction and having a chocolate flavor/aroma. Examples include chocolate-flavored cake mixes, ice creams, syrups, baking goods, etc. The term includes chocolate-flavored compositions (e.g., cakes, nougats, puddings, etc.), as well as compositions not having a chocolate-flavor (e.g., caramels, etc.).

4. Methods of Measuring Taste and Texture Attributes

In certain embodiments of the present application, the taste and texture attributes of a food product can be modified by admixing a flavor composition with the food product as described herein. In certain embodiments, the attribute(s) can be enhanced or reduced by increasing or decreasing the concentration of the flavor composition admixed with the food product. In certain embodiments, the taste or texture attributes of the modified food product can be evaluated as described herein, and the concentration of flavor composition admixed with the food product can be increased or decreased based on the results of the evaluation.

Taste and texture attributes can be reliably and reproducibly measured using sensory analysis methods known as descriptive analysis techniques. The Spectrum™ method of descriptive analysis is described in Morten Meilgaard, D.Sc. et al., Sensory Evaluation Techniques (3d ed. 1999). The Spectrum™ method is a custom design approach meaning that the highly trained panelists who generate the data also develop the terminology to measure the attributes of interest. Further, the method uses intensity scales created to capture the intensity differences being investigated. These intensity scales are anchored to a set of well-chosen references. Using these references helps make the data universally understandable and usable over time. This ability to reproduce the results at another time and with another panel makes the data potentially more valuable than analytical techniques which offer similar reproducibility but lack the ability to fully capture the integrated sensory experiences as perceived by humans.

When conducting quantitative descriptive analysis for compounds that modify other compounds, the testing methodology can be adapted to capture the change in character and intensity of the modified compound. For example, when testing for compounds that modify the saltiness of other compounds, the panelists may first taste a salt reference of agreed upon saltiness in order to establish a reference point for comparison. After tasting the reference, panelists may taste and score the test sample for saltiness as well as any other basic taste, chemical feeling factor, or aromatic notes.

To quantify any increase in salt perception, the panelists may then re-taste the reference and again assign scores for saltiness as well as any other basic taste, chemical feeling factor, or aromatic notes. To quantify any lingering aftertaste, panelists may re-taste the salt reference at 1 minute intervals until their saltiness perception returns to the level of the reference. During the aftertaste evaluations, the panelists also note and score any other basic taste, chemical feeling factor, or aromatic notes.

5. Non-Limiting Examples of Compositions of the Disclosure

In certain non-limiting embodiments, the present disclosure provides for a flavor composition comprising one or more potassium salts. In certain embodiments, the flavor composition comprises potassium lactate. In certain embodiments, the flavor composition comprises potassium acetate. In certain embodiments, the flavor composition comprises a mixture or blend of potassium lactate and potassium acetate.

In certain non-limiting embodiments, the present disclosure provides for a food product comprising a flavor composition as described herein, wherein the flavor composition is present at a concentration of from about 0.0000001 to about 1.0% weight/weight of the food product.

In certain non-limiting embodiments, the present disclosure provides for a fat-based confection comprising a flavor composition as described herein, wherein the flavor composition is present at a concentration of from about 0.1 to about 6.5% weight/weight by weight of the fat-based confection, or from about 0.5 to about 6.5% weight/weight by weight of the fat-based confection. In certain embodiments, the fat-based confection comprises chocolate.

In certain non-limiting embodiments, the present disclosure provides for a fat-based confection comprising a flavor composition as described herein, wherein the flavor composition is present at a concentration of from about 1 to about 15% weight/weight by weight of the fat-based confection. In certain embodiments, the fat-based confection comprises cocoa liquor.

6. Non-Limiting Examples of Methods of the Disclosure

In certain non-limiting embodiments, the present disclosure provides for a method of increasing an alkalized cocoa flavor profile intensity in a food product comprising admixing the food product with a flavor composition comprising one, two or more potassium salts as described herein, wherein the flavor composition is present at a concentration of from about 0.0000001 to about 1.0% in the admixture.

In certain non-limiting embodiments, the present disclosure provides for a method of increasing an alkalized cocoa flavor profile intensity in a fat-based confection comprising admixing the fat-based confection with a flavor composition comprising one, two or more potassium salts as described herein, wherein the flavor composition is present at a concentration of from about 0.1 to about 6.5% weight/weight by weight of the fat-based confection, or from about 0.5 to about 6.5% weight/weight by weight of the fat-based confection. In certain embodiments, the fat-based confection comprises chocolate.

In certain non-limiting embodiments, the present disclosure provides for a method of increasing an alkalized cocoa flavor profile intensity in a fat-based confection comprising admixing the fat-based confection with a flavor composition comprising one, two or more potassium salts as described herein, wherein the flavor composition is present at a concentration of from about 1 to about 15% weight/weight by weight of the fat-based confection. In certain embodiments, the fat-based confection comprises cocoa liquor.

EXAMPLES

The presently disclosed subject matter will be better understood by reference to the following Examples, which are provided as exemplary of the invention, and not by way of limitation.

Example 1-65% Cocoa Dark Chocolate Comprising a Flavor Composition

The present example describes 65% cocoa dark chocolate food products comprising a flavor composition of the present application, wherein the flavor composition comprises a mixture of potassium lactate and potassium acetate at different concentrations.

FIG. 1 describes 65% cocoa dark chocolate samples comprising a flavor composition comprising potassium acetate and potassium lactate at different weight/weight percentages by weight of the chocolate.

FIG. 2 describes 1 kg samples of 65% cocoa dark chocolate comprising a flavor composition comprising potassium acetate and potassium lactate present at different masses (grams) in the chocolate samples.

Example 2—Cocoa Liquor Comprising a Flavor Composition

The present example describes cocoa liquor food products comprising a flavor composition of the present application, wherein the flavor composition comprises a mixture of potassium lactate and potassium acetate at different concentrations.

Figure 3:
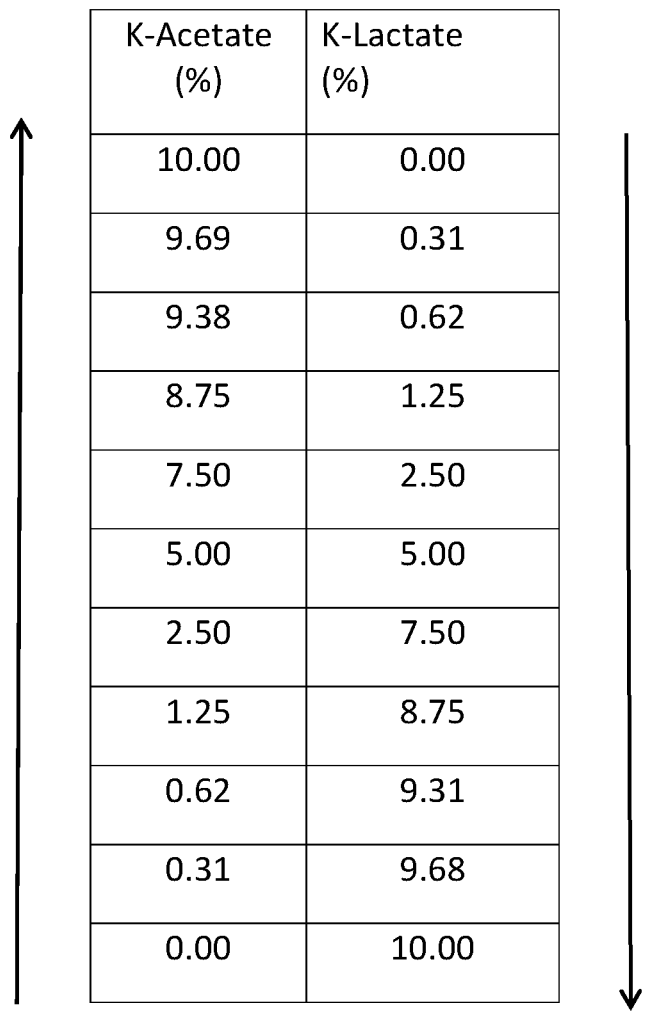
FIG. 3 depicts cocoa liquor samples comprising a flavor composition comprising potassium acetate and potassium lactate at different weight/weight percentages by weight of the cocoa liquor in accordance with Example 1.

FIG. 3 describes cocoa liquor samples comprising a flavor composition comprising potassium acetate and potassium lactate at different weight/weight percentages by weight of the cocoa liquor.

Example 3—Cocoa Flavanols are Retained in Cocoa Liquor with Added Potassium Salts The present example describes a chocolate food product (i.e., cocoa liquor) comprising a flavor composition of the present application, wherein the flavor composition comprises a mixture of potassium lactate and potassium acetate. The amount of cocoa flavanols present in cocoa liquor with the added potassium lactate and potassium acetate was determined. The level of cocoa flavanols present in alkalized cocoa liquor was also determined.

As described by Table 2 below, adding potassium lactate and potassium acetate to cocoa liquor did not reduce the level of cocoa flavanols present in the cocoa liquor. In contrast, alkalizing cocoa liquor reduced the level of cocoa flavanols compared to cocoa liquor that was not alkalized. Thus, an alkalized flavor can be provided in a chocolate product by adding potassium lactate and/or potassium acetate to the chocolate product without reducing the level of cocoa flavanols.

TABLE 2

|  | Cocoa Flavanol content (mg/g material); n = 3 | Alkalized cocoa flavor profile |
|---|---|---|
| 1. Non-alkalized Cocoa liquor | 16.66 | No |
| 2. Cocoa liquor + alkalized salts* | 16.87 | Yes |
| 3. Alkalized cocoa liquor | 1.5 | Yes |

*alkalized salts = 1.99% w/w potassium acetate + 1.25% w/w potassium lactate by weight of the cocoa liquor Table 3, below, describes a cocoa liquor product with alkalized salts (i.e., potassium lactate and potassium acetate) and a 65% cocoa dark chocolate product comprising the alkalized salts.

TABLE 3

|  | Potassium lactate (% w/w) | Potassium acetate (% w/w) |
|---|---|---|
| Base + alkalized salts (Cocoa liquor + alkalized salts) | 1.25 | 1.99 |
| Finished Product (65% cocoa dark chocolate recipe) | 0.25 | 0.40 |

Example 4—Sensory Analysis of Non-Alkalized Chocolate Samples Comprising Potassium Salts The present example describes the sensory analysis of chocolate samples (i.e., 65% dark chocolate) comprising a mixture of potassium acetate and potassium lactate. The chocolate samples were quantitatively analyzed for flavor attributes by a sensory panel. Additionally, the sensory panel also quantitatively analyzed an alkalized/bicarbonate attribute in both the non-alkalized chocolate samples comprising potassium salts, and a high intensity alkalized chocolate reference standard.

65% dark chocolate was prepared according to the recipe describe below, and was used for the preparation of the non-alkalized chocolate samples comprising potassium salts, and the alkalized chocolate reference standards.

Chocolate Recipe (65% Dark Chocolate)

Chocolate Liquor—55%
Cocoa Butter—10%
Sugar—35%
Soy Lecithin—0.35%

Sensory Methodology

Trained sensory panelists evaluated sensory attributes of the chocolate samples according to the Spectrum™ method of descriptive analysis, as described in Morten Meilgaard, D.Sc. et al., Sensory Evaluation Techniques (3d ed. 1999). The Spectrum™ method is a custom design approach wherein highly trained panelists who generate the data also develop the terminology to measure the attributes of interest. Further, the method uses intensity scales created to capture the intensity differences being investigated.

In the present example, samples were quantitatively analyzed for flavor attributes by the Sensory Spectrum Food Panel, trained and experienced in this type of evaluation. The strength of each attribute was rated on the 15-point Spectrum Scale, where 0=none and 15=very strong, in comparison to a reference standard for each attribute. In addition to evaluating each attribute independently, the strength of balance/blend of all the attributes was evaluated using a 10 point scale.

When evaluating each sample, each panelist received approximately 1 oz. of sample to evaluate aromatics, basic tastes, and chemical feeling factors. All samples were then expectorated. Each Panelist recorded his or her individual ratings, and then each attribute was discussed among the panelists until a consensus value was decided upon and recorded. Additional samples were provided to the panelists as needed.

The attributes evaluated for the non-alkalized chocolate samples comprising potassium salts are shown in Table 4. For the alkalized chocolate reference standards, an alkalized/bicarbonate attribute was analyzed.

TABLE 4

| Sensory attributes of chocolate samples evaluated by sensory panelists. | |
|---|---|
| AROMATICS | |
| Total Impact | The intensity of all odors of a product when its volatiles enter the nasal passages and are perceived by the olfactory system. |
| Chocolate Essence | The aromatics associated with the cocoa beans appropriately fermented and roasted to develop full flavor, typifiled by high quality roasted West African beans. |
| Woody | The aromatics associated with the general category of wood, including cedar, hickory, mesquite, fruitwood and evergreen. Each type can be wet, raw or toasted. |
| Woody/Twig/Rope | The aromatics associated with wood, specifically twigs. |
| Nutty | The aromatics associated with a nut complex: pecan, almond, hazelnut, etc. |
| Winey | The aromatics associated with wines. |
| Alkalized/Bicarbonate | The aromatics associated with baking soda, a slightly fishy, briny characteristic. |
| Fruit Complex | The aromatics associated with the total fruit impact and may include different types of fruits and fruit processing methods. |
| Red Fruit | The aromatics associated with the total impact of red berries that includes the synthesized, raw and cooked notes associated with berries including strawberries, raspberries, and cherries. |
| Brown Fruit | The aromatics associated with the general category of brown fruit including raisins, prunes, figs, etc. |
| Dairy Complex | The aromatics associated with the total dairy impact and may include different types of dairy and different processes. |
| Sweet Aromatics | The aromatics associated with product which also smell such a honey, maple syrup, brown sugar, and vanilla. |
| Fermented Fruit | The aromatics associated with fermented fruits, reminiscent of ethanol and rotting vegetation such as corn husks. |

TABLE 4-continued

Sensory attributes of chocolate samples evaluated by sensory panelists.

| | |
|---|---|
| Soured/Silage | The aromatics associated with fermentation, silage or damp animal feed |
| Inorganic Chemical | The aromatics associated with inorganic chemicals. |
| Balance and Blent | The degree to which the individual ingredients blend together into a well combined scent making it difficult to identify each componenet |
| BASIC TASTES | |
| Sweet | The taste on the tongue associated with sugars and high potency sweeteners |
| Sour | The taste on the tongue stimulated by acid, such as citric, malic, phosphoric, etc. |
| Salty | The taste on the tongue associated with sodium and other salts |
| Bitter | The taste on the tongue associated with caffeine and other bitter substances, such as quinine and hop bitters. |
| CHEMICAL FEELING FACTORS | |
| Astringency | The shrinking or puckering of the tongue surface caused by substances such as tannins or alum. |
| Chemical Feel | General chemical sensation on tongue, may be related to feel imparted by yeast. |
| Metallic | The chemical feeling factor on the surface of the tongue stimulated by metal ions from iron, copper and zinc. It has a flat feel: metal coins placed in the mouth can be used as a reference. |
| Bicarbonate | A mouthfeel associated with baking soda which leaves a coated feeling on the mouth and tongue when there is nothing physically there. |

Alkalized Chocolate Reference Standards

Four chocolate standards were prepared having increasing alkalized chocolate intensity using the chocolate recipe (65% Dark Chocolate) described above. The four reference standards were prepared by using various amounts of alkalized chocolate liquor in the reference standards, as described by Table 5. The chocolate reference standards were used as references to allow trained sensory panelists to develop a reference for the Alkalized/Bicarbonate attribute measured in a quantitative descriptive analysis taste profile testing of chocolate test samples comprising various concentrations of potassium salts.

TABLE 5

Alkalized chocolate liquor used in the four alkalized chocolate reference standards.

| Intensity | Ghana Chocolate Liquor (%) | Alkalized Chocolate Liquor (%) |
|---|---|---|
| Absent | 100 | 0 |
| Low | 90 | 10 |
| Medium | 80 | 20 |
| High | 70 | 30 |

Prior to conducting the quantitative descriptive analysis taste profile testing of non-alkalized chocolate test samples comprising various concentrations of potassium salts, the four alkalized chocolate reference standards were evaluated by the trained sensory panelists. When evaluating the chocolate standards, the trained sensory panel rated the High Intensity chocolate sample as having an intensity rating of 1.5-2 for the Alkalized/Bicarbonate attribute compared to an Alkalized/Bicarbonate attribute reference. Therefore, an Alkalized/Bicarbonate attribute rating of 1.5-2 for the experimental non-alkalized chocolate test samples comprising potassium salts would correlate to a taste experience similar to a dark chocolate with a high intensity of alkalized chocolate.

Experimental Chocolate Test Sample 1

Experimental chocolate test sample 1 included 0.34% potassium acetate (K-Acetate) and 0.00% potassium Lactate (K-Lactate). The sample was prepared by adding the potassium salts to the 65% dark chocolate recipe described previously, which contained no alkalized chocolate. The result of the sensory panel's evaluation of test sample 1 is shown in Table 6. The test sample had a moderate total impact, and comprised primarily of Chocolate Essence and Nutty notes. This sample contained low Winery notes. The Alkalized/Bicarbonate attribute was present at a level of 0.5, in comparison to a control with no alkalized cocoa liquor which had an Alkalized/Bicarbonate attribute level of 0, and in comparison to a High Intensity alkalized chocolate (i.e. a use level of 30% alkalized cocoa w/w by weight of the cocoa liquor) which had an Alkalized/Bicarbonate attribute intensity level of 1.5-2. The Balance/Blend was moderate/high for this sample. The results indicate that the addition of 0.34% K-Acetate/0.00% K-Lactate to chocolate elicits an Alkalized/Bicarbonate attribute intensity of 0.5 without the addition of alkalized cocoa liquor or alkalized chocolate.

TABLE 6

Descriptive profile of chocolate sample containing 0.34% K-Acetate/0.00% K-Lactate.

| Sample | 0.34% K-Acetate/ 0.00% K-Lactate) |
|---|---|
| Aromatics | |
| Total Impact | 7.5 |
| Chocolate Essence | 6.0 |
| Woody | 0.0 |
| Woody/Twig/Rope | 0.0 |
| Nutty | 2.0 |
| Winey | 1.5 |
| Alkalized/Bicarbonate | 0.5 |
| Dark Roast | 0.0 |
| Fruit Complex | 0.0 |
| Red Fruit | 0.0 |
| Brown Fruit | 0.0 |
| Dairy Complex | 0.0 |
| Sweet Aromatics | 0.0 |
| Fermented Fruit | 0.0 |
| Soured/Silage | 0.0 |
| Inorganic Chemical | 0.0 |
| Balance and Blend | 7.0 |
| Basic Tastes | |
| Sweet | 8.0 |
| Sour | 3.0 |
| Salty | 1.0 |

TABLE 6-continued

Descriptive profile of chocolate sample containing 0.34% K-Acetate/0.00% K-Lactate.

| Sample | 0.34% K-Acetate/ 0.00% K-Lactate) |
|---|---|
| Bitter | 2.0-4.0 |
| Chemical FF | |
| Astringency | 0.0 |
| Metallic | 0.0 |
| Bicarbonate | 0.0 |

Experimental Chocolate Test Sample 2

Experimental chocolate test sample 2 included 5.5% K-Acetate/0.00% K-Lactate. The sample was prepared by adding the potassium salts to the 65% dark chocolate recipe described previously, which contained no alkalized chocolate. The result of the sensory panel's evaluation of test sample 2 is shown in Table 7. The test sample was moderate in total impact, and comprised primarily of Chocolate Essence and Nutty notes. This sample contained low woody aromatics notes. The Alkalized/Bicarbonate attribute was present at a level of 2.0, in comparison to a control with no alkalized cocoa liquor which had an Alkalized/Bicarbonate attribute level of 0. The Balance/Blend was low for this sample. The results indicate that the addition of 5.5% K-Acetate/0.00% K-Lactate to chocolate elicits an Alkalized/Bicarbonate attribute intensity of 2.0 without the addition of alkalized cocoa liquor or alkalized chocolate. An Alkalized/Bicarbonate attribute intensity of 2.0 is similar to the Alkalized/Bicarbonate attribute intensity of a chocolate made with high level alkalized cocoa liquor (i.e. a use level of 30% alkalized cocoa w/w by weight of the cocoa liquor).

TABLE 7

Descriptive profile of chocolate sample containing 5.5% K-Acetate/0.00% K-Lactate.

| Sample | 5.50% K-Acetate/ 0.00% K-Lactate) |
|---|---|
| Aromatics | |
| Total Impact | 7.0 |
| Chocolate Essence | 2.0 |
| Woody | 2.0 |
| Woody/Twig/Rope | 0.0 |
| Nutty | 1.5 |
| Winey | 0.0 |
| Alkalized/Bicarbonate | 2.0 |
| Dark Roast | 0.0 |
| Fruit Complex | 0.0 |
| Red Fruit | 0.0 |
| Brown Fruit | 0.0 |
| Dairy Complex | 0.0 |
| Sweet Aromatics | 0.0 |
| Fermented Fruit | 0.0 |
| Soured/Silage | 2.5 |
| Inorganic Chemical | 0.0 |
| Balance and Blend | 3.0 |
| Basic Tastes | |
| Sweet | 8.0 |
| Sour | 5.0 |
| Salty | 2.5 |
| Bitter | 2.4 |

TABLE 7-continued

Descriptive profile of chocolate sample containing 5.5% K-Acetate/0.00% K-Lactate.

| Sample | 5.50% K-Acetate/ 0.00% K-Lactate) |
|---|---|
| Chemical FF | |
| Astringency | 0.0 |
| Metallic | 0.0 |
| Bicarbonate | 0.0 |

Experimental Chocolate Test Sample 3

Experimental chocolate test sample 3 included 0.3200 K-Acetate/0.02% K-Lactate. The sample was prepared by adding the potassium salts to the 65% dark chocolate recipe described previously, which contained no alkalized chocolate. The result of the sensory panel's evaluation of test sample 3 is shown in Table 8. The test sample was moderate in total impact and contained low-low/moderate Chocolate Essence aromatics. This sample contained low Winey and Woody notes. The Alkalized/Bicarbonate attribute was present at 0.5, in comparison to a control with no alkalized cocoa liquor which had an Alkalized/Bicarbonate attribute level of 0, and in comparison to a High Intensity alkalized chocolate (i.e. a use level of 30% alkalized cocoa w/w by weight of the cocoa liquor) which had an Alkalized/Bicarbonate attribute intensity level of 1.5-2. The Balance/Blend was moderate for this sample. The results indicate that the addition of 0.3200 K-Acetate/0.02% K-Lactate to chocolate elicits an Alkalized/Bicarbonate attribute intensity of 0.5 without the addition of alkalized cocoa liquor or alkalized chocolate.

TABLE 8

Descriptive profile of chocolate sample containing 0.32% K-Acetate/0.02% K-Lactate.

| Sample | 0.32% K-Acetate/ 0.02% K-Lactate |
|---|---|
| Aromatics | |
| Total Impact | 8.0 |
| Chocolate Essence | 6.0 |
| Woody | 0.0 |
| Woody/Twig/Rope | 0.0 |
| Nutty | 2.5 |
| Winey | 1.0 |
| Alkalized/Bicarbonate | 0.5 |
| Dark Roast | 0.0 |
| Fruit Complex | 0.0 |
| Red Fruit | 0.0 |
| Brown Fruit | 0.0 |
| Dairy Complex | 0.0 |
| Sweet Aromatics | 0.0 |
| Fermented Fruit | 0.0 |
| Soured/Silage | 0.0 |
| Inorganic Chemical | 0.0 |
| Balance and Blend | 7.5 |
| Basic Tastes | |
| Sweet | 9.0 |
| Sour | 2.5 |
| Salty | 1.5 |
| Bitter | 3.0 |
| Chemical FF | |
| Astringency | 0.0 |
| Metallic | 0.0 |
| Bicarbonate | 0.0 |

Experimental Chocolate Test Sample 4

Experimental chocolate test sample 4 included 1.290% K-Acetate/0.09% K-Lactate. The sample was prepared by adding the potassium salts to the 65% dark chocolate recipe described previously, which contained no alkalized chocolate. The result of the sensory panel's evaluation of test sample 4 is shown in Table 9. The test sample was moderate in total impact contained low-low/moderate Chocolate Essence aromatics. This sample contained low Woody and low Fermented Fruit notes. The Alkalized/Bicarbonate attribute was present at 1.2, in comparison to a control without alkalized cocoa liquor which had an Alkalized/Bicarbonate attribute equal to 0, and in comparison to a High Intensity alkalized chocolate (i.e. a use level of 30% alkalized cocoa w/w by weight of the cocoa liquor) which had an Alkalized/Bicarbonate attribute intensity level of 1.5-2. The Balance/Blend was low for this sample. The results indicate that the addition of 1.29% K-Acetate/0.09% K-Lactate to chocolate elicits an Alkalized/Bicarbonate attribute intensity of 1.2 without the addition of alkalized cocoa liquor or alkalized chocolate.

TABLE 9

Descriptive profile of chocolate sample containing 1.29% K-Acetate/0.09% K-Lactate.

| Sample | 1.29% K-Acetate/ 0.09% K-Lactate |
|---|---|
| Aromatics | |
| Total Impact | 7.0 |
| Chocolate Essence | 4.5 |
| Woody | 2.0 |
| Woody/Twig/Rope | 0.0 |
| Nutty | 0.0 |
| Winey | 0.0 |
| Alkalized/Bicarbonate | 1.2 |
| Dark Roast | 0.0 |
| Fruit Complex | 0.0 |
| Red Fruit | 0.0 |
| Brown Fruit | 0.0 |
| Dairy Complex | 0.0 |
| Sweet Aromatics | 0.0 |
| Fermented Fruit | 2.2 |
| Soured/Silage | 0.0 |
| Inorganic Chemical | 0.0 |
| Balance and Blend | 2.0 |
| Basic Tastes | |
| Sweet | 7.8 |
| Sour | 4.0 |
| Salty | 2.0 |
| Bitter | 3.5 |
| Chemical FF | |
| Astringency | 0.0 |
| Metallic | 0.0 |
| Bicarbonate | 0.0 |

Example 5—Alkalized Chocolate Flavor of a Non-Alkalized Chocolate Sample Comprising Potassium Salts The present example describes the sensory analysis of alkalized chocolate flavor in a 53% dark chocolate sample comprising alkalized chocolate liquor, and a 53% dark chocolate sample comprising potassium salts and no alkalized chocolate liquor. The composition of the 53% dark chocolate sample comprising alkalized chocolate liquor is shown in Table 10. The composition of the 53% dark chocolate sample comprising potassium salts and no alkalized chocolate liquor is shown in Table 11.

TABLE 10

Control chocolate recipe-53% dark chocolate comprising alkalized chocolate liquor.

| Chocolate Components | % |
|---|---|
| Vanillin | 0.21 |
| Soy Lecithin | 0.54 |
| Cocoa Butter | 7.69 |
| Chocolate Liquor Alkalized | 19.93 |
| Chocolate Liquor (Non-Alkalized) | 25.45 |
| Sugar | 46.18 |

TABLE 11

53% dark chocolate recipe containing potassium salts (0.397% K-Acetate/0.249% K-Lactate) and no alkalized chocolate liquor.

| Chocolate Components | % |
|---|---|
| Vanillin | 0.21 |
| Soy Lecithin | 0.54 |
| Cocoa Butter | 7.69 |
| K-Acetate | 0.397 |
| K-Lactate | 0.249 |
| Chocolate Liquor (Non-Alkalized) | 44.75 |
| Sugar | 46.18 |

The chocolate sample containing 0.397% K-Acetate and 0.249% K-Lactate was evaluated sensorially by tasters. The alkalized chocolate liquor present in the chocolate control was replaced with non-alkalized chocolate liquor in combination with the K-Acetate and K-Lactate in the test recipe. The results indicated that the addition of 0.397% K-Acetate/0.249% K-Lactate to the chocolate elicited an alkalized chocolate flavor intensity equivalent to chocolate with alkalized cocoa liquor without the addition of alkalized cocoa liquor or alkalized chocolate.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. A composition, comprising:
   a nonalkalized chocolate; and
   a confectionery flavor comprising potassium lactate, potassium acetate, or a combination thereof, wherein the composition comprises the confectionery flavor composition in an amount of about 0.1% w/w to about 6.5% w/w by weight of the nonalkalized chocolate.

2. The confectionery flavor composition of claim 1, wherein the confectionery flavor composition comprises potassium lactate and potassium acetate.

3. The composition of claim 1, wherein a ratio of potassium lactate to potassium acetate is from about 2% to 98% to about 98% to 2%.

4. The composition of claim 1, wherein a taste and/or flavor profile of the composition is not statistically different from a taste and/or flavor profile of an alkalized chocolate.

5. The composition of claim 1, wherein a level of cocoa flavanols present in the composition is the same as a level of cocoa flavanols present in an alkalized chocolate or a chocolate composition that has not undergone alkalization.

6. The confectionary flavor composition of claim 1, wherein the confectionery flavor composition provides an alkalized/bicarbonate attribute intensity to the chocolate composition.

7. A confectionery flavor composition capable of providing an alkalized/bicarbonate attribute intensity to a nonalkalized chocolate composition, the confectionery flavor composition comprising potassium lactate and potassium acetate, wherein a ratio of potassium lactate to potassium acetate in the confectionary flavor composition is from about 2% to 98% to about 98% to 2%, wherein the confectionery flavor composition is capable of providing the alkalized/bicarbonate attribute intensity to the nonalkalized chocolate composition.

* * * * *